United States Patent
Rogers et al.

(10) Patent No.: US 10,216,775 B2
(45) Date of Patent: *Feb. 26, 2019

(54) CONTENT SELECTION FOR STORAGE TIERING

(71) Applicant: Hitachi Vantara Corporation, Santa Clara, CA (US)

(72) Inventors: Richard Rogers, Bellevue, WA (US); Vitaly Zolotusky, Arlington, MA (US); Alan G. Bryant, East Walpole, MA (US)

(73) Assignee: Hitachi Vantara Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/448,736

(22) Filed: Mar. 3, 2017

(65) Prior Publication Data

US 2017/0177257 A1 Jun. 22, 2017

Related U.S. Application Data

(63) Continuation of application No. 14/364,196, filed as application No. PCT/US2012/031102 on Mar. 29, 2012, now Pat. No. 9,589,002.

(51) Int. Cl.
*G06F 17/30* (2006.01)
*G06F 3/06* (2006.01)

(52) U.S. Cl.
CPC ...... *G06F 17/30312* (2013.01); *G06F 3/0625* (2013.01); *G06F 3/0634* (2013.01);
(Continued)

(58) Field of Classification Search
USPC .................................. 707/736; 711/114, 100
See application file for complete search history.

(56) References Cited

U.S. PATENT DOCUMENTS 6,747,706 B1 * 6/2004 Geddes ................ H04H 60/07
348/441
7,155,466 B2 12/2006 Rodriguez et al.
(Continued)

FOREIGN PATENT DOCUMENTS

EP 1975798 A1 10/2008

OTHER PUBLICATIONS

Extended European Search Report received in corresponding European Application No. 12872746.8 dated Jun. 10, 2015.
(Continued)

*Primary Examiner* — Hung T Vy
(74) *Attorney, Agent, or Firm* — Mattingly & Malur, PC

(57) ABSTRACT

A method, of managing storage of content of a system in storage units including run units which do not allow spin-down functionality and spin-down units which allow spin-down functionality, comprises: establishing a storage tiering rule which sets a policy indicating what content is eligible to be stored on a run unit and what content is eligible to be stored on a spin-down unit, the storage tiering rule being applicable to at least a group of the contents in the content system to determine stored content eligibility thereof for storage in the storage units and migration between the storage units; and identifying candidates of contents to migrate between the storage units, based on the storage tiering rule, state of the content system, and the stored content eligibility of the at least a group of the contents.

12 Claims, 10 Drawing Sheets

(52) U.S. Cl.
CPC .......... *G06F 3/0649* (2013.01); *G06F 3/0665* (2013.01); *G06F 3/0685* (2013.01); *G06F 3/0689* (2013.01); *Y02D 10/154* (2018.01)

(56) References Cited

U.S. PATENT DOCUMENTS

| | | |
|---|---|---|
| 7,567,188 B1 | 7/2009 | Anglin et al. |
| 7,657,581 B2 | 2/2010 | Orenstein et al. |
| 8,006,111 B1 | 8/2011 | Faibish et al. |
| 8,745,327 B1* | 6/2014 | Throop ................. G06F 3/0647 711/100 |
| 9,589,002 B2* | 3/2017 | Rogers ................. G06F 3/0625 |
| 2004/0243761 A1 | 12/2004 | Bohrer et al. |
| 2006/0143419 A1 | 6/2006 | Tulyani |
| 2007/0189153 A1 | 8/2007 | Mason |
| 2007/0271306 A1* | 11/2007 | Brown .............. G06F 17/30551 |
| 2009/0204649 A1* | 8/2009 | Wong ................ G06F 17/30153 |
| 2011/0106802 A1 | 5/2011 | Pinkney et al. |
| 2012/0079191 A1* | 3/2012 | Jaquette ............... H04N 21/231 711/114 |
| 2014/0310455 A1* | 10/2014 | Baldwin ............... G06F 3/0641 711/114 |

OTHER PUBLICATIONS

Translation of Chinese Office Action received in corresponding Chinese Application No. 2012800656700 dated Mar. 2, 2016.

* cited by examiner

FIG. 8A

SERVICE PLANS - HITACHI CONTENT
HTTPS://ADMIN...

SERVICE PLANS

▽ CREATE SERVICE PLAN

SERVICE PLAN NAME                    DESCRIPTION

STORAGE TIERING PLAN FOR SPINDOWN
◉ NEVER MOVE OBJECTS TO SPINDOWN STORAGE
○ MOVE OBJECTS TO SPINDOWN STORAGE USING CUSTOM TIME SETTING:
○ MOVE ALL BUT ONE COPY OF AN OBJECT TO SPINDOWN STORAGE WHEN DPL IS GREATER THAN 1

[CREATE SERVICE]   [CANCEL]

| | SERVICE PLANS | DESCRIPTION |
|---|---|---|
| ☑ | DEFAULT | DEFAULT |
| ☑ | DPL TIER | MOVE ALL BUT ONE COPY WHEN DPL GREATER THAN 1 |
| ☑ | FAST TIERING | TIER OBJECTS AFTER ONE DAY |

© 2012 HITACHI DATA SYSTEMS CORPORATION. ALL RIGHTS RESERVED   V5.0.D.83 | SERIAL NUMBER: 00001

CONTENT SELECTION FOR STORAGE TIERING

BACKGROUND OF THE INVENTION

The present invention relates generally to storage systems and, more particularly, to system and method for managing storage of content in a content system based on content selection for storage tiering.

A Fixed Content System (FCS) contains data that does not change. Only a small percentage of the content is actually subsequently accessed; however the data still remains on storage media that is continually consuming power resources. Power is wasted keeping the media spinning even though much of the content on the media is not accessed.

U.S. Pat. No. 8,006,111 discloses the concept of spin-down. Under this approach, file movement and power state of the disk drives are determined based on the activity of the file. Groups of files having become inactive in the active storage are successively migrated to respective evacuated active/inactive disk drives so that each active/inactive disk drive is loaded with files having a similar probability of access when access to the active/inactive disk drive reaches an inactivity threshold for powering down the active/inactive disk drive. The focus is on individual disk drives. Files are moved only when the inactivity threshold has been reached.

BRIEF SUMMARY OF THE INVENTION

Exemplary embodiments of the invention provide a fixed content system (FCS), which may be a replicated object storage system or content platform and which classifies storage media into two types, namely, a Run Unit (RU) and a Spin-Down Unit (SDU). RU is designated for likely used content and SDU contains not-likely used content. Periodically, the FCS will evaluate content based on configurable service plans and storage tiering policies to identify candidates for moving between the RU media and the SDU media. Storage tiering dictates system behavior based on system state to optimize the object movement and device manipulation, so that data movement will only be performed when the system condition dictates the need. The system state that is monitored is whether the RU in which an object resides has reached consumption utilization threshold (i.e., space/storage consumption threshold), and whether there is space available on a SDU for the object. An example of a consumption utilization threshold is consumed storage (e.g., 70% consumed storage can be used as a default). The Storage Tiering Rule (STR) specifies the policy for object candidacy to reside on a SDU or a RU. In specific embodiments, the settings are "never," "protection copies only," or "N days after ingest." An STR can be applied to all objects or a collection of objects in the FCS.

In specific embodiments, the content identification for tiering is performed in the background. When content is identified, the SDU media will be spun-up (if necessary), and the object(s) moved. After an inactivity timeout, the SDU media will be spun-down. If content is requested of the FCS and it resides on a SDU, the SDU will be spun-up and the content read and returned to the requestor. After an inactivity timeout, the SDU media will again be spun-down.

This invention differs from U.S. Pat. No. 8,006,111 in various respects. For example, the determination to move a file is not based on the activity of the individual file. Instead, the criteria for establishing file movement include the age of the file, the existence of redundant backup copies, and the like. While U.S. Pat. No. 8,006,111 focuses on individual disk drives, the solution according to specific embodiments of this invention encompasses functionality implemented in a disk array and the focus is on RAID Groups in the form of a collection of disk drives. Furthermore, the solution according to specific embodiments of this invention will not move content off of active storage unless a space/storage consumption threshold has been reached at the storage on which it resides. In contrast, U.S. Pat. No. 8,006,111 will move files only when inactivity threshold has been reached.

A fixed content system has a plurality of independent nodes to store contents in a plurality of storage units including run units which do not allow spin-down functionality and spin-down units which allow spin-down functionality. In accordance with an aspect of the present invention, a method of managing storage of the contents comprises: establishing a storage tiering rule which sets a policy indicating what content is eligible to be stored on a run unit and what content is eligible to be stored on a spin-down unit, the storage tiering rule being applicable to at least a group of the contents in the content system to determine stored content eligibility thereof for storage in the storage units and migration between the storage units; monitoring a state of the content system; and identifying candidates of contents to migrate between the storage units including migration between the run units and the spin-down units, based on the storage tiering rule, the state of the content system, and the stored content eligibility of the at least a group of the contents.

In some embodiments, the storage tiering rule is established to evaluate the contents to determine stored content eligibility based on a set of criteria which include expected usage, life-cycle, and age of a content and existence of one or more redundant backup copies of the content. The storage tiering rule includes a "Never" rule that applies to contents that are to be stored on storage units that will never be spun down, a "Protection copies only" rule that applies to contents for backup copies which are candidates for storage in spin-down units, and an "X amount of time after ingest" rule that applies to contents that have resided in the content system for a configurable amount of time X which is sufficient to become a candidate to be stored on a spin-down unit. The storage tiering rule is established so as to only migrate eligible content to a spin-down unit when the run unit on which the eligible content resides has reached a configurable consumption utilization threshold. Monitoring the state of the content system comprises determining whether a run unit in which a content resides has reached a configurable consumption utilization threshold indicating permission to migrate the content to a spin-down unit, and determining whether there is space available on a spin-down unit for receiving the content from the run unit.

In specific embodiments, the method further comprises migrating the contents based on the identifying; and managing a state of each of the spin-down units into an appropriate state of powered up or powered down based on system needs for storing the contents and migrating the contents as a result of the monitoring, the identifying, and the migrating. The method further comprises selecting a service plan out of a plurality of service plans each specifying a storage tiering strategy that utilizes a combination of different storage classes of the storage units including the run units and the spin-down units in the storage subsystem, and a storage tiering rule setting a policy to determine stored content eligibility for storage of the contents in the different storage classes of storage units.

Another aspect of the invention is directed to an apparatus for managing storage of content in a content system having a plurality of independent nodes to store the contents in a plurality of storage units including run units which do not allow spin-down functionality and spin-down units which allow spin-down functionality. The apparatus comprises a processor, a memory, and a storage tiering service module. The storage tiering service module is configured to: establish a storage tiering rule which sets a policy indicating what content is eligible to be stored on a run unit and what content is eligible to be stored on a spin-down unit, the storage tiering rule being applicable to at least a group of the contents in the content system to determine stored content eligibility thereof for storage in the storage units and migration between the storage units; monitor a state of the content system; and identify candidates of contents to migrate between the storage units including migration between the run units and the spin-down units, based on the storage tiering rule, the state of the content system, and the stored content eligibility of the at least a group of the contents.

In some embodiments, the apparatus further comprises a migration module configured to migrate the contents based on the identifying, and a storage unit state managing module configured to manage a state of each of the spin-down units into an appropriate state of powered up or powered down based on system needs for storing the contents and migrating the contents as a result of the monitoring, the identifying, and the migrating. The apparatus further comprises a service plan selection module configured to provide a user interface for selecting a service plan out of a plurality of service plans each specifying a storage tiering strategy that utilizes a combination of different storage classes of the storage units including the run units and the spin-down units in the storage subsystem, and a storage tiering rule setting a policy to determine stored content eligibility for storage of the contents in the different storage classes of storage units. The run units are contained on RAID Groups that are not configured to allow spin-down functionality and wherein the spin-down units are contained on RAID Groups that are configured to allow for spin-down. The storage units include different classes of storage units having at least one of different reliability, performance, or cost characteristics. The apparatus further comprises a migration module configured to migrate the contents based on the identifying, and to move the contents between the run units and the spin-down units of different classes based on metadata criteria of the contents, the object metadata criteria including one or more of "Type of data," "Time from last access," "Time from ingest," and "Version of the content."

Another aspect of this invention is directed to a computer-readable storage medium storing a plurality of instructions for controlling a data processor to manage storage of content in a content system having a plurality of independent nodes to store the contents in a plurality of storage units including run units which do not allow spin-down functionality and spin-down units which allow spin-down functionality. The plurality of instructions comprise: instructions that cause the data processor to establish a storage tiering rule which sets a policy indicating what content is eligible to be stored on a run unit and what content is eligible to be stored on a spin-down unit, the storage tiering rule being applicable to at least a group of the contents in the content system to determine stored content eligibility thereof for storage in the storage units and migration between the storage units; instructions that cause the data processor to monitor a state of the content system; and instructions that cause the data processor to identify candidates of contents to migrate between the storage units including migration between the run units and the spin-down units, based on the storage tiering rule, the state of the content system, and the stored content eligibility of the at least a group of the contents.

These and other features and advantages of the present invention will become apparent to those of ordinary skill in the art in view of the following detailed description of the specific embodiments.

BRIEF DESCRIPTION OF THE DRAWINGS

FIGS. 8A-8C show an example of a user interface for selecting a service plan out of a plurality of service plans each specifying a storage tiering strategy, FIG. 8A shows a screen shot for creating a service plan and selecting the tiering policies. FIG. 8B shows a screen shot showing what happens when selecting a service plan for a namespace to be created. FIG. 8C shows a screen shot showing how to change the service plan on an existing namespace.

DETAILED DESCRIPTION OF THE INVENTION

Figure 1:
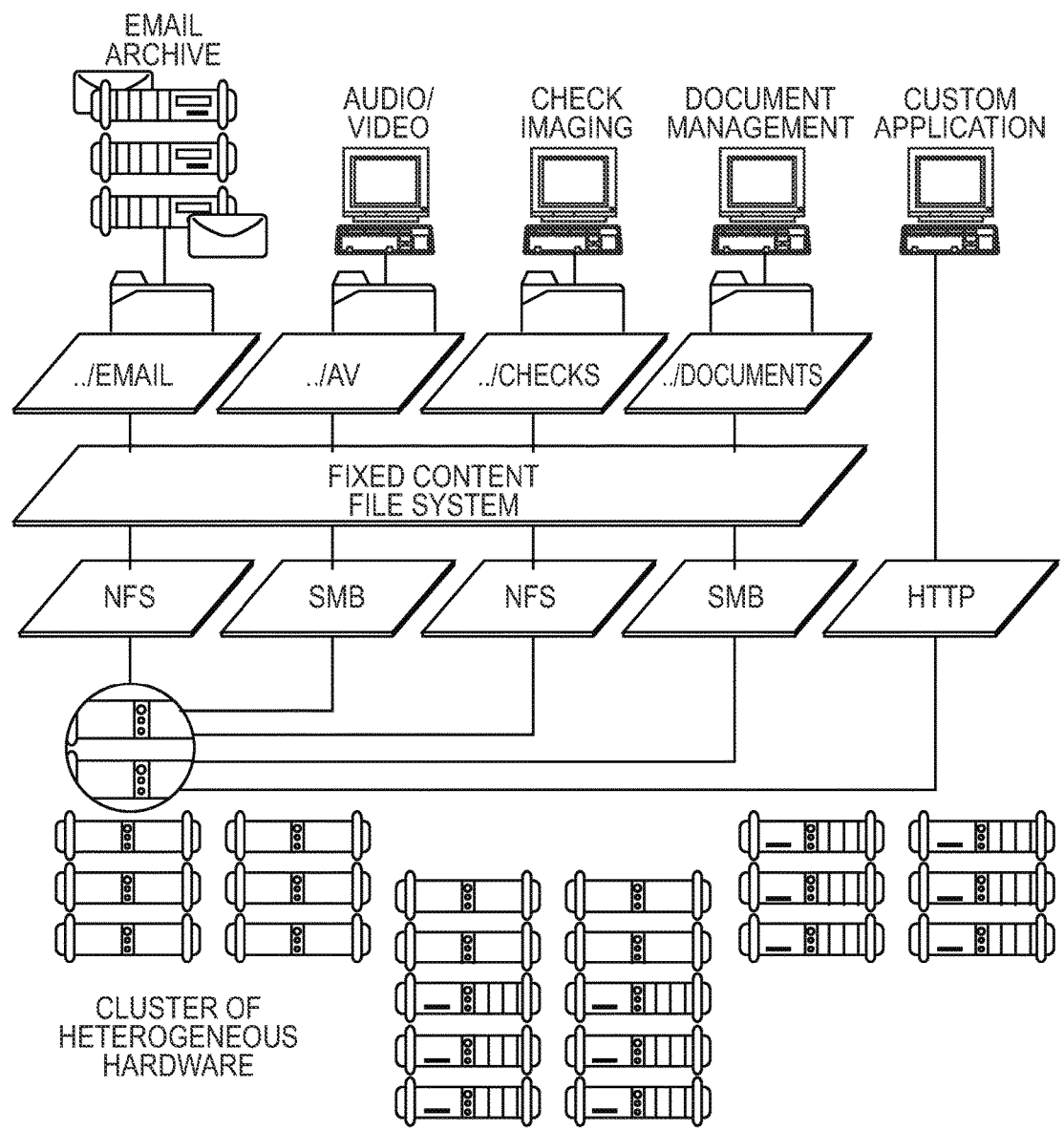
FIG. 1 is a simplified block diagram of a fixed content storage archive in which the method and apparatus of the invention may be applied.

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment," "this embodiment," or "these embodiments" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Furthermore, some portions of the detailed description that follow are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The present invention also relates to an apparatus for performing the operations herein. This apparatus may be specially constructed for the required purposes, or it may include one or more general-purpose computers selectively activated or reconfigured by one or more computer programs. Such computer programs may be stored in a computer-readable storage medium, such as, but not limited to optical disks, magnetic disks, read-only memories, random access memories, solid state devices and drives, or any other types of media suitable for storing electronic information. The algorithms and displays presented herein are not inherently related to any particular computer or other apparatus. Various general-purpose systems may be used with programs and modules in accordance with the teachings herein, or it may prove convenient to construct a more specialized apparatus to perform desired method steps. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

Exemplary embodiments of the invention, as will be described in greater detail below, provide apparatuses, methods and computer programs for managing storage of fixed content in a fixed content system based on content selection for storage tiering.

I. Fixed Content Distributed Data Storage

A need has developed for the archival storage of "fixed content" in a highly available, reliable and persistent manner that replaces or supplements traditional tape and optical storage solutions. The term "fixed content" typically refers to any type of digital information that is expected to be retained without change for reference or other purposes. Examples of such fixed content include, among many others, e-mail, documents, diagnostic images, check images, voice recordings, film and video, and the like. The traditional Redundant Array of Independent Nodes (RAIN) storage approach has emerged as the architecture of choice for creating large online archives for the storage of such fixed content information assets. By allowing nodes to join and exit from a cluster as needed, RAIN architectures insulate a storage cluster from the failure of one or more nodes. By replicating data on multiple nodes, RAIN-type archives can automatically compensate for node failure or removal. Typically, RAIN systems are largely delivered as hardware appliances designed from identical components within a closed system.

FIG. 1 illustrates one such scalable disk-based archival storage management system. The nodes may comprise different hardware and thus may be considered "heterogeneous." A node typically has access to one or more storage disks, which may be actual physical storage disks, or virtual storage disks, as in a storage area network (SAN). The archive cluster application (and, optionally, the underlying operating system on which that application executes) that is supported on each node may be the same or substantially the same. The software stack (which may include the operating system) on each node is symmetric, whereas the hardware may be heterogeneous. Using the system, as illustrated in FIG. 1, enterprises can create permanent storage for many different types of fixed content information such as documents, e-mail, satellite images, diagnostic images, check images, voice recordings, video, and the like, among others. These types are merely illustrative, of course. High levels of reliability are achieved by replicating data on independent servers, or so-called storage nodes. Preferably, each node is symmetric with its peers. Thus, because preferably any given node can perform all functions, the failure of any one node has little impact on the archive's availability.

Figure 2:
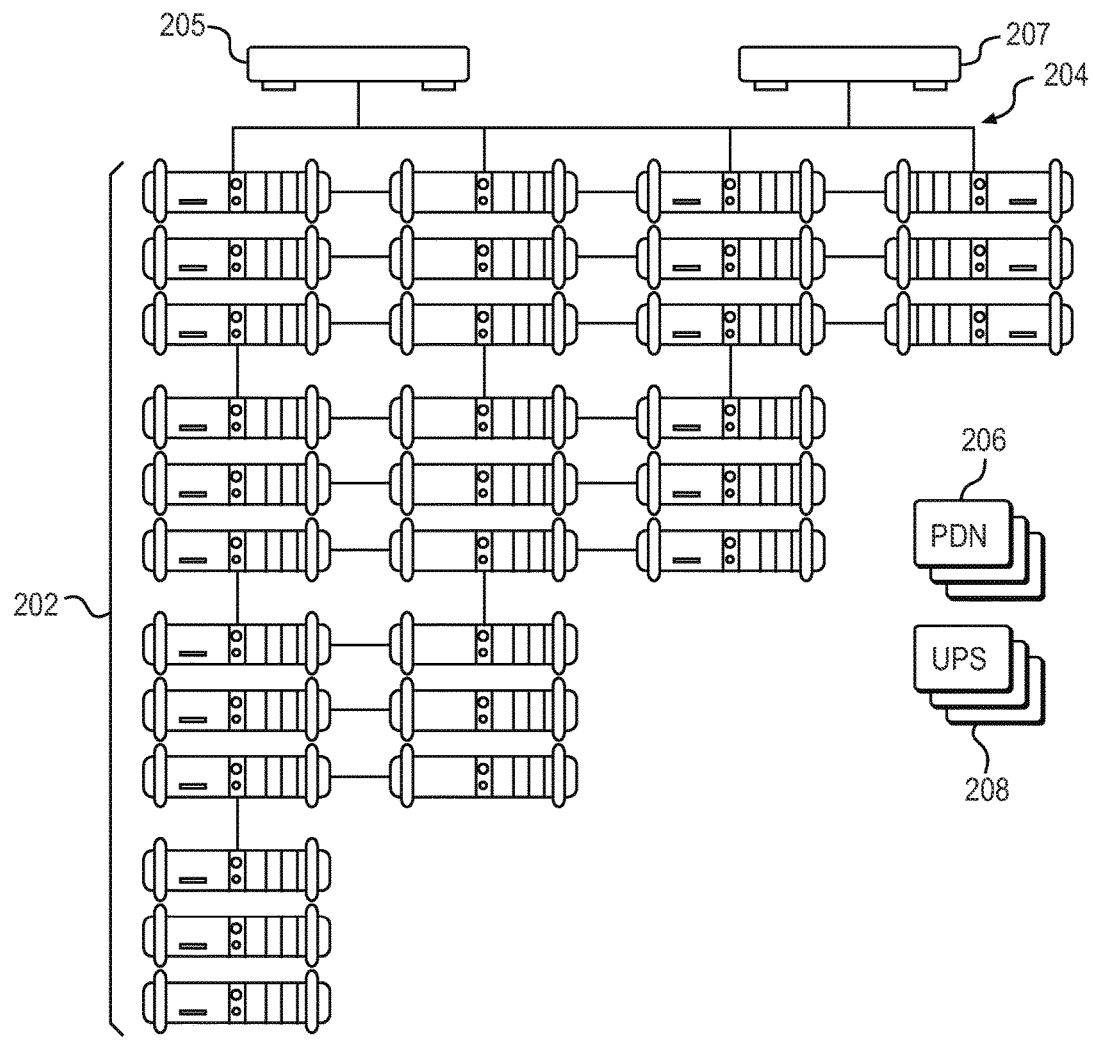
FIG. 2 is a simplified representation of a redundant array of independent nodes each of which is symmetric and supports an archive cluster application.

As described in commonly owned U.S. Pat. No. 7,155,466, it is known in a RAIN-based archival system to incorporate a distributed software application executed on each node that captures, preserves, manages, and retrieves digital assets. FIG. 2 illustrates one such system. A physical boundary of an individual archive is referred to as a cluster (or a system). Typically, a cluster is not a single device, but rather a collection of devices. Devices may be homogeneous or heterogeneous. A typical device is a computer or machine running an operating system such as Linux. Clusters of Linux-based systems hosted on commodity hardware provide an archive that can be scaled from a few storage node servers to many nodes that store thousands of terabytes of data. This architecture ensures that storage capacity can always keep pace with an organization's increasing archive requirements.

In storage systems such as described above, data typically is distributed across the cluster randomly so that the archive is always protected from device failure. If a disk or node fails, the cluster automatically fails over to other nodes in the cluster that maintain replicas of the same data. While this approach works well from a data protection standpoint, a calculated mean time to data loss (MTDL) for the cluster may not be as high as desired. In particular, MTDL typically represents a calculated amount of time before the archive will lose data. In a digital archive, any data loss is undesirable, but due to the nature of hardware and software components, there is always a possibility (however remote) of such an occurrence. Because of the random distribution of objects and their copies within an archive cluster, MTDL may end up being lower than required since, for example, a needed copy of an object may be unavailable if a given disk (on which a mirror copy is stored) within a given node fails unexpectedly.

As shown in FIG. 2, an illustrative cluster in which the present invention is implemented preferably comprises the following general categories of components: nodes 202, a pair of network switches 204, power distribution units (PDUs) 206, and uninterruptible power supplies (UPSs) 208. A node 202 typically comprises one or more commodity servers and contains a CPU (e.g., Intel x86, suitable random access memory (RAM), one or more hard drives (e.g., standard IDE/SATA, SCSI, or the like), and two or more network interface (NIC) cards. A typical node is a 2U rack mounted unit with a 2.4 GHz chip, 512 MB RAM, and six (6) 200 GB hard drives. This is not a limitation, however. The network switches 204 typically comprise an internal switch 205 that enables peer-to-peer communication between nodes, and an external switch 207 that allows extra-cluster access to each node. Each switch requires enough ports to handle all potential nodes in a cluster. Ethernet or GigE switches may be used for this purpose. PDUs 206 are used to power all nodes and switches, and the UPSs 208 are used that protect all nodes and switches. Although not meant to be limiting, typically a cluster is connectable to a network, such as the public Internet, an enterprise intranet, or other wide area or local area network. In an illustrative embodiment, the cluster is implemented within an enterprise environment. It may be reached, for example, by navigating through a site's corporate DNS name server. Thus, for example, the cluster's domain may be a new sub-domain of an existing domain. In a representative implementation, the sub-domain is delegated in the corporate DNS server to the name servers in the cluster itself. End users access the cluster using any conventional interface or access tool. Thus, for example, access to the cluster may be carried out over any IP-based protocol (HTTP, FTP, NFS, AFS, SMB, a Web service, or the like), via an API, or through any other known or later-developed access method, service, program, or tool.

Client applications access the cluster through one or more types of external gateways such as standard UNIX file protocols, or HTTP APIs. The archive preferably is exposed through a virtual file system that can optionally sit under any standard UNIX file protocol-oriented facility. These include NFS, FTP, SMB/CIFS, or the like.

In one embodiment, the archive cluster application runs on a redundant array of independent nodes (H-RAIN) that are networked together (e.g., via Ethernet) as a cluster. The hardware of given nodes may be heterogeneous. For maximum reliability, however, preferably each node runs an instance 300 of the distributed application (which may be the same instance, or substantially the same instance), which comprises several runtime components as now illustrated in FIG. 3. Thus, while hardware may be heterogeneous, the software stack on the nodes (at least as it relates to the present invention) is the same. These software components comprise a gateway protocol layer 302, an access layer 304, a file transaction and administration layer 306, and a core components layer 308. The "layer" designation is provided for explanatory purposes, as one of ordinary skill will appreciate that the functions may be characterized in other meaningful ways. One or more of the layers (or the components therein) may be integrated or otherwise. Some components may be shared across layers.

The gateway protocols in the gateway protocol layer 302 provide transparency to existing applications. In particular, the gateways provide native file services such as NFS 310 and SMB/CIFS 312, as well as a Web services API to build custom applications. HTTP support 314 is also provided. The access layer 304 provides access to the archive. In particular, according to the invention, a Fixed Content File System (FCFS) 316 emulates a native file system to provide full access to archive objects. FCFS gives applications direct access to the archive contents as if they were ordinary files. Preferably, archived content is rendered in its original format, while metadata is exposed as files. FCFS 316 provides conventional views of directories and permissions and routine file-level calls, so that administrators can provision fixed-content data in a way that is familiar to them. File access calls preferably are intercepted by a user-space daemon and routed to the appropriate core component (in layer 308), which dynamically creates the appropriate view to the calling application. FCFS calls preferably are constrained by archive policies to facilitate autonomous archive management. Thus, in one example, an administrator or application cannot delete an archive object whose retention period (a given policy) is still in force.

The access layer 304 preferably also includes a Web user interface (UI) 318 and an SNMP gateway 320. The Web user interface 318 preferably is implemented as an administrator console that provides interactive access to an administration engine 322 in the file transaction and administration layer 306. The administrative console 318 preferably is a password-protected, Web-based GUI that provides a dynamic view of the archive, including archive objects and individual nodes. The SNMP gateway 320 offers storage management applications easy access to the administration engine 322, enabling them to securely monitor and control cluster activity. The administration engine monitors cluster activity, including system and policy events. The file transaction and administration layer 306 also includes a request manager process 324. The request manager 324 orchestrates all requests from the external world (through the access layer 304), as well as internal requests from a policy manager 326 in the core components layer 308.

In addition to the policy manager 326, the core components also include a metadata manager 328, and one or more instances of a storage manager 330. A metadata manager 328 preferably is installed on each node. Collectively, the metadata managers in a cluster act as a distributed database, managing all archive objects. On a given node, the metadata manager 328 manages a subset of archive objects, where preferably each object maps between an external file ("EF," the data that entered the archive for storage) and a set of internal files (each an "IF") where the archive data is physically located. The same metadata manager 328 also manages a set of archive objects replicated from other nodes. Thus, the current state of every external file is always available to multiple metadata managers on several nodes. In the event of node failure, the metadata managers on other nodes continue to provide access to the data previously managed by the failed node. The storage manager 330 provides a file system layer available to all other components in the distributed application. Preferably, it stores the data objects in a node's local file system. Each drive in a given node preferably has its own storage manager. This allows the node to remove individual drives and to optimize throughput. The storage manager 330 also provides system information, integrity checks on the data, and the ability to traverse directly local structures.

Figure 3:
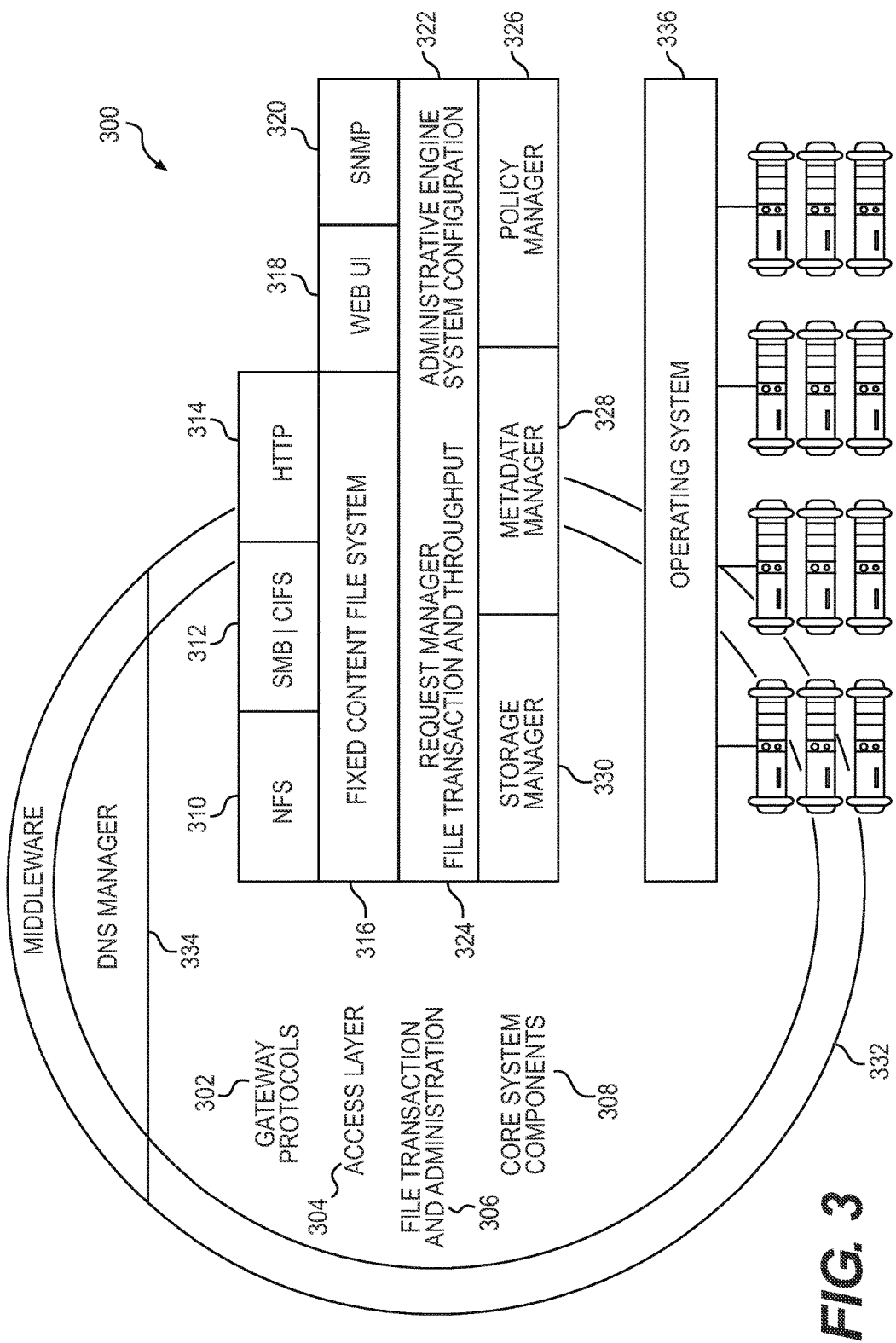
FIG. 3 is a high level representation of the various components of the archive cluster application executing on a given node.

As also illustrated in FIG. 3, the cluster manages internal and external communication through a communications middleware layer 332 and a DNS manager 334. The infrastructure 332 is an efficient and reliable message-based middleware layer that enables communication among archive components. In an illustrated embodiment, the layer supports multicast and point-to-point communications. The DNS manager 334 runs distributed name services that connect all nodes to the enterprise server. Preferably, the DNS manager (either alone or in conjunction with a DNS service) load balances requests across all nodes to ensure maximum cluster throughput and availability.

In an illustrated embodiment, an application such as the HCP (Hitachi Content Platform) application instance executes on a base operating system 336, such as Red Hat Linux 9.0, Fedora Core 6, or the like. The communications middleware is any convenient distributed communication mechanism. Other components may include FUSE (Filesystem in USErspace), which may be used for the Fixed Content File System (FCFS) 316. The NFS gateway 310 may be implemented by a standard nfsd Linux Kernel NFS driver. The database in each node may be implemented, for example, PostgreSQL (also referred to herein as Postgres), which is an object-relational database management system (ORDBMS). The node may include a Web server, such as Jetty, which is a Java HTTP server and servlet container. Of course, the above mechanisms are merely illustrative.

The storage manager 330 on a given node is responsible for managing the physical storage devices. Preferably, each storage manager instance is responsible for a single root directory into which all files are placed according to its placement algorithm. Multiple storage manager instances can be running on a node at the same time, and each usually represents a different physical disk in the system. The storage manager abstracts the drive and interface technology being used from the rest of the system. When the storage manager instance is asked to write a file, it generates a full path and file name for the representation for which it will be responsible. In a representative embodiment, each object to be stored on a storage manager is received as raw data to be stored, with the storage manager then adding its own metadata to the file as it stores the data to keep track of different types of information. By way of example, this metadata includes: EF length (length of external file in bytes), IF Segment size (size of this piece of the Internal File), EF Protection representation (EF protection mode), IF protection role (representation of this internal file), EF Creation timestamp (external file timestamp), Signature (signature of the internal file at the time of the write (PUT), including a signature type), and EF Filename (external file filename). Storing this additional metadata with the internal file data provides for additional levels of protection. In particular, scavenging can create external file records in the database from the metadata stored in the internal files. Other policies can validate internal file hash against the internal file to validate that the internal file remains intact.

Internal files may be "chunks" of data representing a portion of the original "file" in the archive object, and they may be placed on different nodes to achieve striping and protection blocks. This breaking apart of an external file into smaller chunked units is not a requirement, however; in the alternative, internal files may be complete copies of the external file. Typically, one external file entry is present in a metadata manager for each archive object, while there may be many internal file entries for each external file entry. Typically, internal file layout depends on the system. In a given implementation, the actual physical format of this data on disk is stored in a series of variable length records.

The request manager 324 is responsible for executing the set of operations needed to perform archive actions by interacting with other components within the system. The request manager supports many simultaneous actions of different types, is able to roll-back any failed transactions, and supports transactions that can take a long time to execute. The request manager further ensures that read/write operations in the archive are handled properly and guarantees all requests are in a known state at all times. It also provides transaction control for coordinating multiple read/write operations across nodes to satisfy a given client request. In addition, the request manager caches metadata manager entries for recently used files and provides buffering for sessions as well as data blocks.

A cluster's primary responsibility is to store an unlimited number of files on disk reliably. A given node may be thought of as being "unreliable," in the sense that it may be unreachable or otherwise unavailable for any reason. A collection of such potentially unreliable nodes collaborate to create reliable and highly available storage. Generally, there are two types of information that need to be stored: the files themselves and the metadata about the files. Additional details of the fixed content distributed data storage can be found in U.S. Patent Publication No. 2007/0189153 and U.S. Pat. No. 7,657,581, which are incorporated herein by reference.

As used herein, a namespace is a logical partition of the cluster, and essentially serves as a collection of objects particular to at least one defined application. Each namespace has a private filesystem with respect to other namespaces. Moreover, access to one namespace does not grant a user access to another namespace. A cluster/system of nodes is a physical archive instance. A tenant is a grouping of namespace(s) and possibly other subtenants. A cluster/system is a physical archive instance. See commonly assigned U.S. Patent Application Publication No. 2011/0106802, which is incorporated herein by reference in its entirety.

II. Content Selection for Storage Tiering

Figure 4:
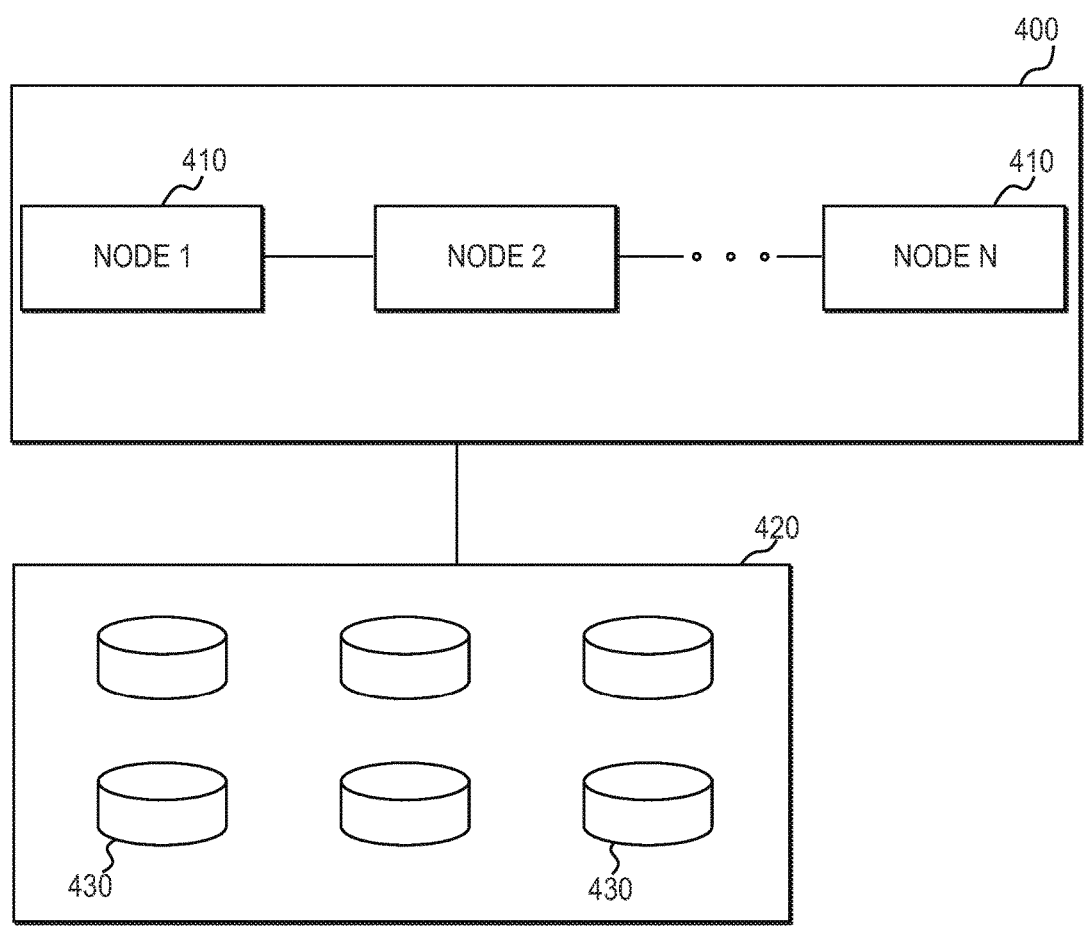
FIG. 4 is a simplified diagram of a fixed content system having a group of nodes that are coupled to a block-based storage sub-system to store the fixed content.

According to exemplary embodiments, a fixed content system (FCS) 400 has a group of nodes 410 that are coupled, typically via a network, to a block-based storage sub-system 420 having a plurality of storage media units 430 to store the fixed content, as seen in FIG. 4. In a preferred embodiment, the storage sub-system is a back-end disk array that allows a group of disks to be configured together into a RAID Group and carved up into individual logical disk units for satisfying storage needs. More advanced storage sub-systems have the ability to indicate which disk or group of disks is allowed to have the power controlled to RAID Groups to allow for powering the disks up and down.

Embodiments of this invention will utilize these storage sub-systems features to create two classes of logical disk units called Run Units (RUs) and Spin-Down Units (SDUs). A RU will be contained on RAID Groups that are not configured to allow disk spin-down functionality, so that there will always be power to the disks and available for data access. The SDU will be contained on RAID Groups that are configured to allow for disk spin-down, so that the disks can be powered down and hence the data on those disks will not be readily available until the disks are re-powered and have spun back up.

To define how the RU and SDU are used, a Storage Tiering Rule (STR) is established. The appropriate STR is determined from the expected usage and life-cycle of the data stored on the FCS. The STR indicates what content is eligible to be stored on a RU or a SDU. According to one embodiment, there are three STRs defined that are applied to either all content or a group of content stored on the FCS. The first STR is "Never" and refers to all data that should be stored on RUs or on SDU-indicated storage that will not be spun down. The second STR is "Protection Copies Only" and refers to protection copies. In a fixed content system, content can be protected by storing multiple copies of the content. Typically, the backup copy or copies are rarely accessed. These backup copies are candidates for the SDUs as protection copies. The third STR is "X amount of time after ingest" and refers to a content that has resided in the FCS for a configurable amount of time sufficient to become a candidate to be stored on a SDU.

Regardless of the STR assigned, the FCS can also be configured to only migrate eligible content to a SDU when the RUs have reached a configurable used space/storage capacity threshold. Any eligible content can remain on the RUs with non-eligible content without additional cost; furthermore, it may be less beneficial to power up a SDU to migrate eligible content than leaving it on the RUs.

By providing RUs and SDUs along with STR configuration, the FCS is able to operate on the content of the FCS using a storage tiering service (STS). The STS will run periodically and is responsible for the following activities: (1) manage the state of the SDUs into the appropriate state of powered up or powered down based on the system needs; and (2) migrate content between the RUs and SDUs based on the STR configuration, the state of the FCS, and stored content eligibility. The state of the FCS, including the status of the storage media units (run units and spin-down units), are monitored. In specific embodiments, the STS is provided in each node in the FCS.

Figure 5:
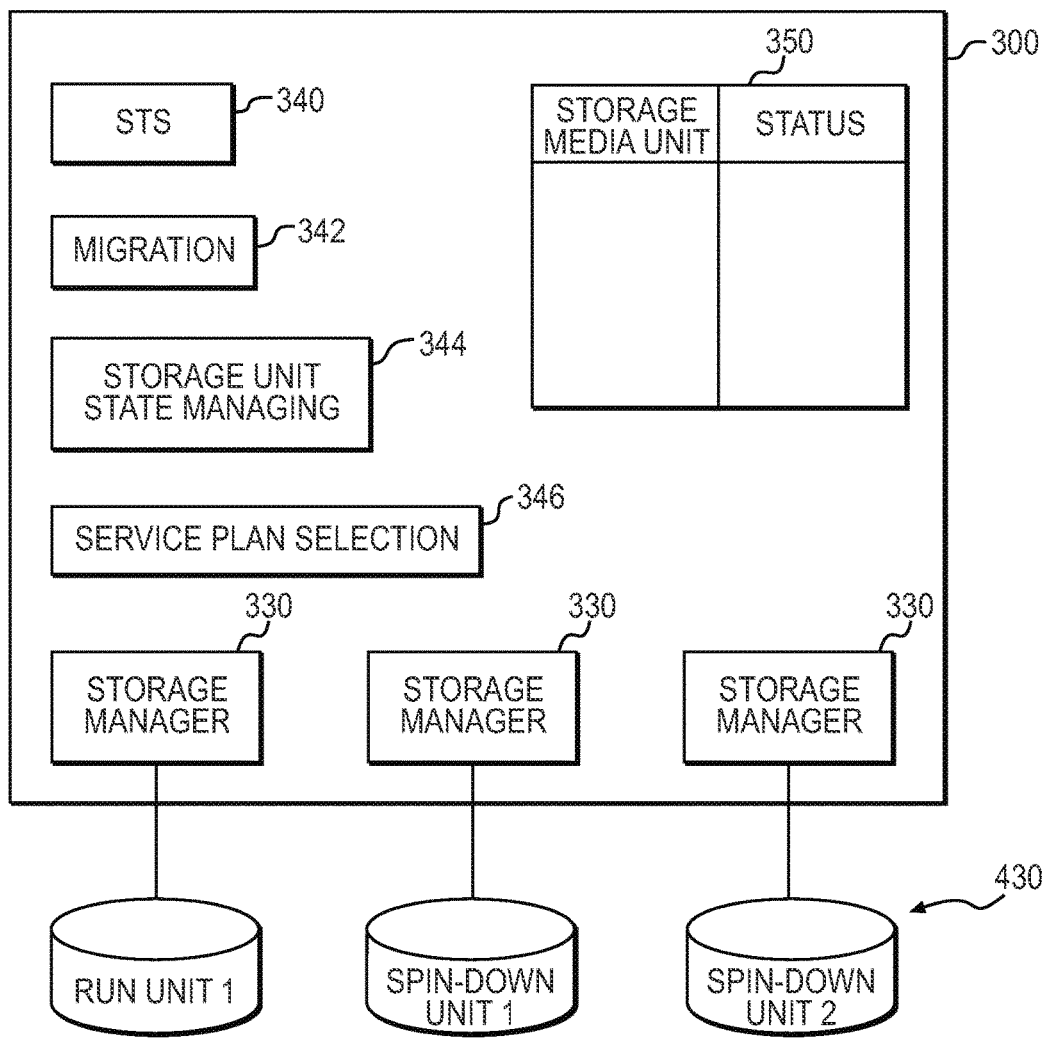
FIG. 5 is a simplified diagram schematically illustrating a node having a storage tiering service (STS) module, a storage media status table listing the storage media units in the node and their status, and multiple instances of the storage manager.

FIG. 5 is a simplified diagram schematically illustrating a node (300 of FIG. 3 or 410 of FIG. 4) having a STS module 340, a storage media status table 350 listing the storage media units for the node and their status (e.g., capacity), and multiple instances of the storage manager 330 (see FIG. 3). For example, each instance of the storage manager 330 is responsible for a single root directory into which all files are placed according to its placement algorithm. Each storage manager instance usually represents a different logical volume in the FCS. FIG. 5 shows the connection between the node 300 and storage units 430 (RU and SDU) via instances of the storage manager 330 (connection typically through a network). In one preferred embodiment, all the nodes store the same storage media status table 350 listing the storage media units and their status for all the nodes. The status of the storage media units may be monitored separately and that information is then shared among the interconnected nodes to form the same storage media status table 350. The STS module 340 may have the following logic actions:

Build MoveToSDU list of content eligible for movement to SDU.

Build MoveFromSDU list of content on SDU but not eligible for SDU.

Filter MoveToSDU list to only contain content that resides on RUs that have reached the capacity threshold configured.

Build SpinUpSDUs list of all SDUs for which content resides in the MoveToSDU and MoveFromSDU lists.

Spin up SDUs in SpinUpSDUs list.

Start migration processing to process MoveToSDU and MoveFromSDU lists to the appropriate destinations.

Figure 6:
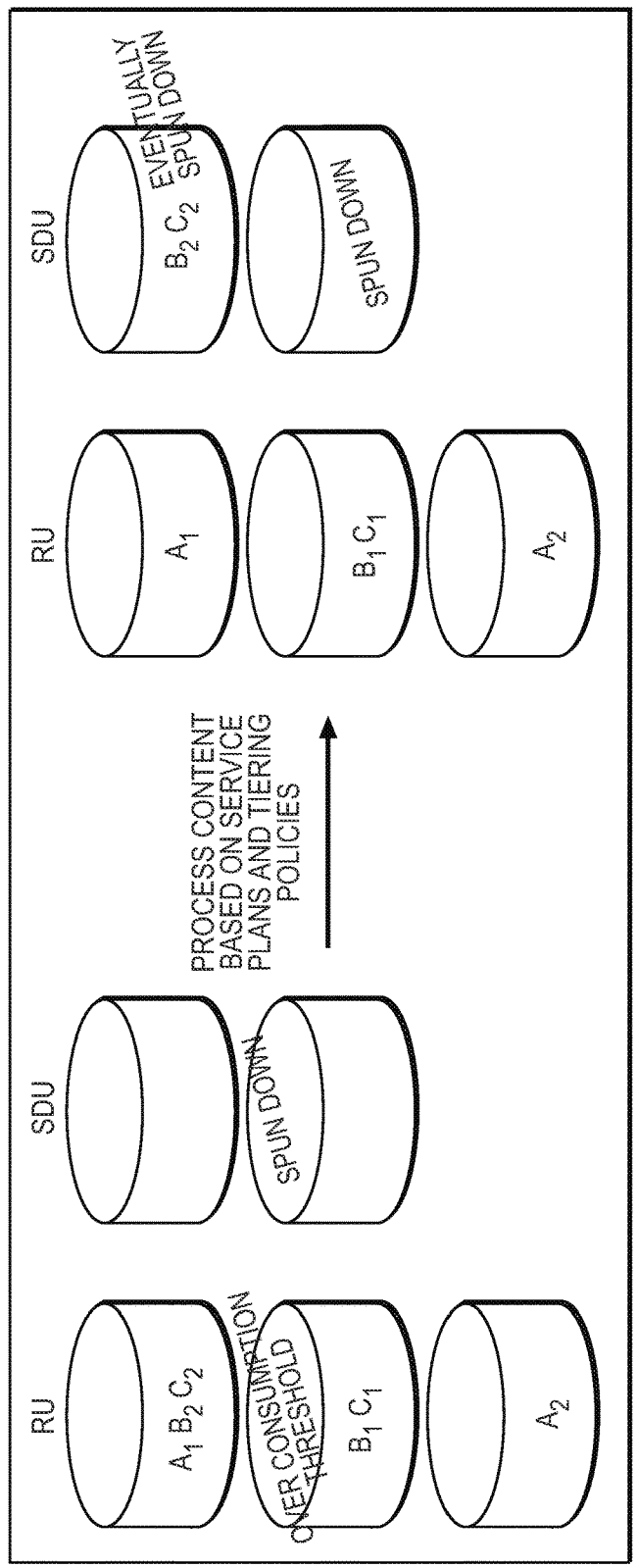
FIG. 6 shows an example to illustrate a process of content selection for storage tiering.

FIG. 6 shows an example to illustrate a process of content selection for storage tiering. In FIG. 6, a FCS has three disks for RU and two disks for SDU that are cluster wide and spread across the nodes. The FCS is configured with a Service Plan which indicates that protection copies should be placed on SDU. The content has a data protection level (DPL) of 2 for the FCS and there are three objects (A, B, C) with two copies on the FCS (A1, A2, B1, B2, C1, C2). The first two RUs (A1B2C2 and B1C1) are over their consumption threshold. The STS scans the FCS to process candidates for movement to SDU. Based on the scanning, the copies B2 and C2 are moved because they are secondary protection copies and reside on the first RU that is over the capacity threshold. No content is moved off the second RU because only primary copies (B1 and C1) of content exist there. The second copy of A2 is not moved because the third RU on which it resides has not gone over the capacity threshold.

In general, objects that are moved to SDU will remain there for the life of the object, unless the Service Plan is changed for the object and it no longer meets the criteria under the Service Plan. Then the object will be moved back to RU.

Alternative embodiments of the invention could also be used to migrate content to various classes of storage having various reliability, performance, and cost characteristics. The different classes of storage may include without limitation Solid State Disks (SSD), Fibre Channel Hard Disk Drives (FC-HDD), or other network storage units.

The decisions for content movement may be expanded to provide intelligent selection of class of storage or location that is based on object metadata either generated automatically by the system or provided by the owner of the content. The following are some example criteria. The first is "Type of data." For example, x-ray images are rarely viewed after the injury has healed and therefore such type of data is a good candidate for spin-down, whereas general medical records are frequently used and such type of data may not be a good candidate for spin-down. The second criterion is "Time from last access." It may be desirable to move data based on its access history. Content that has not been accessed in a while (e.g., six months or more) is a good candidate for spin-down, while content that is accessed more frequently may be moved to run devices. The third criterion is "Time from ingest." It may make sense to move some types of data to spin-down immediately on ingest (e.g., when the data is for back-up only), or six months after ingest, etc. The fourth criterion is "Version of the object." For example, all versions of the object but the most recent version should be on spin down.

The long term goal is for the FCS to support different Service Plans that the cluster administrator can make available or sell to tenant administrators. A Service Plan has a storage tiering strategy which is a combination of storage classes (e.g., always-spun-up disks and spin-down disks) and a set of rules for when data is stored on the different classes of storage. For example, the cluster administrator may want to support a premium Service Plan where data in that strategy is always on spun-up disks. A "standard" Service Plan may include data on spun-up disks for six months, but then data is moved to spin-down disks if not accessed after six months. An "archive" Service Plan that may immediately make content candidates for spin-down disks with the expectation that data access is not likely and delays to access content is acceptable. Ultimately, the goal is for the cluster administrator to be able to define Service Plans and to make available or sell those Plans at different rates to the tenant administrators.

Figure 7:
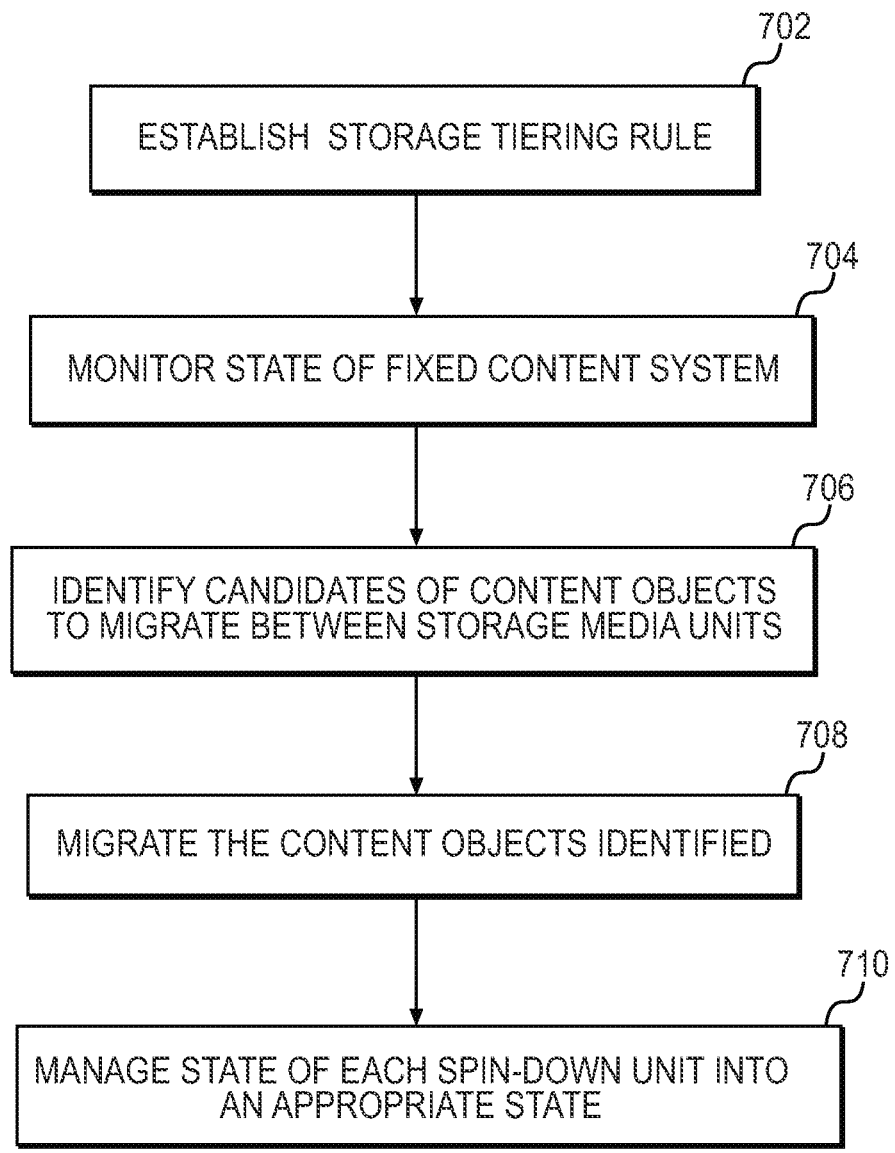
FIG. 7 is an example of a flow diagram illustrating STS performed by the STS module.

FIG. 7 is an example of a flow diagram illustrating storage tiering service (STS) performed by the STS module 340. In step 702, the STS module 340 establishes a storage tiering rule which sets a policy indicating what fixed content is eligible to be stored on a run unit and what fixed content is eligible to be stored on a spin-down unit, the storage tiering rule being applicable to at least a group of the fixed content in the fixed content system to determine stored content eligibility thereof for storage in the storage units and migration between the storage units. This is typically done with input from an administrator. In specific embodiments, the storage tiering rule is established to evaluate the content objects to determine stored content eligibility based on a set of criteria which include expected usage, life-cycle, and age of a content object, and existence of one or more redundant backup copies of the content object. Moreover, the storage tiering rule may be established so as to only migrate eligible content to a spin-down unit when the run unit on which the eligible content resides has reached a configurable consumption utilization threshold.

In step 704, the STS module 340 monitors a state of the fixed content system. For example, this may involve determining whether a run unit in which an object resides has reached a configurable consumption utilization threshold indicating permission to migrate the object to a spin-down unit, and determining whether there is space available on a spin-down unit for receiving the object from the run unit.

In step 706, the STS module 340 identifies candidates of content objects to migrate between the storage media units (e.g., between the run units and the spin-down units) based on the storage tiering rule, the state of the fixed content system, and the stored content eligibility of the at least a group of the fixed content.

In step 708, a migration module 342 (see FIG. 5) migrates the content objects based on the identifying. In step 710, a storage unit state managing module 344 (see FIG. 5) manages a state of each of the spin-down units into an appropriate state of powered up or powered down based on system needs for storing the content objects and migrating the content objects as a result of the monitoring, the identifying, and the migrating.

In specific embodiments, the storage units include different classes of storage units having at least one of different reliability, performance, or cost characteristics. The migration module 342 is configured to move the content objects between the run units and the spin-down units of different classes based on object metadata criteria of the content objects, the object metadata criteria including one or more of "Type of data," "Time from last access," "Time from ingest," and "Version of the object."

To initiate the STS process of FIG. 7, according to specific embodiments, a service plan selection module 346 (see FIG. 5) is configured to provide a graphical user interface for selecting a service plan out of a plurality of service plans each specifying a storage tiering strategy that utilizes a combination of different storage classes of the storage units including the run units and the spin-down units in the storage subsystem, and a storage tiering rule setting a policy to determine stored content eligibility for storage of the content objects in the different storage classes of storage units.

Figure 8B:
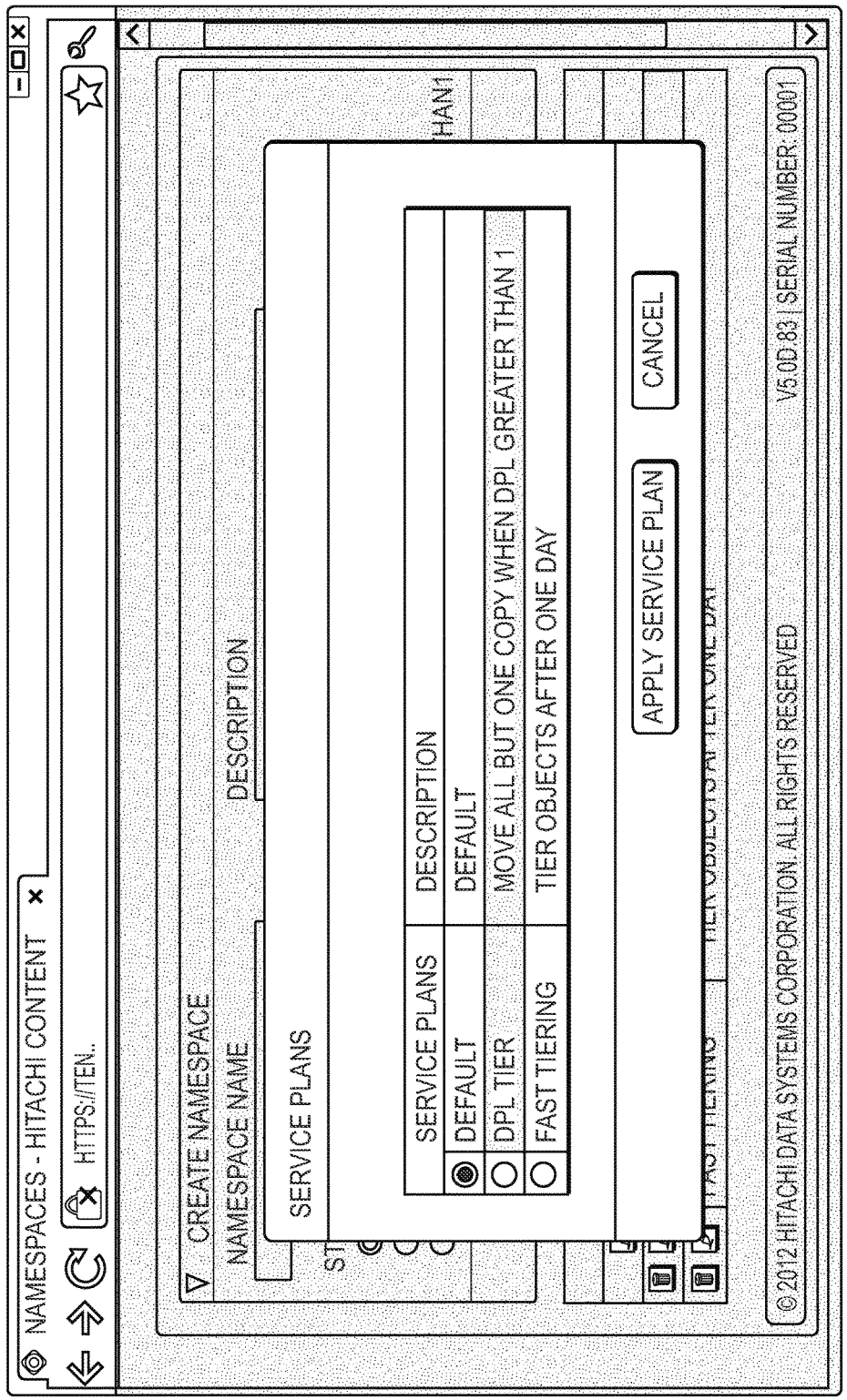
Figure 8C:
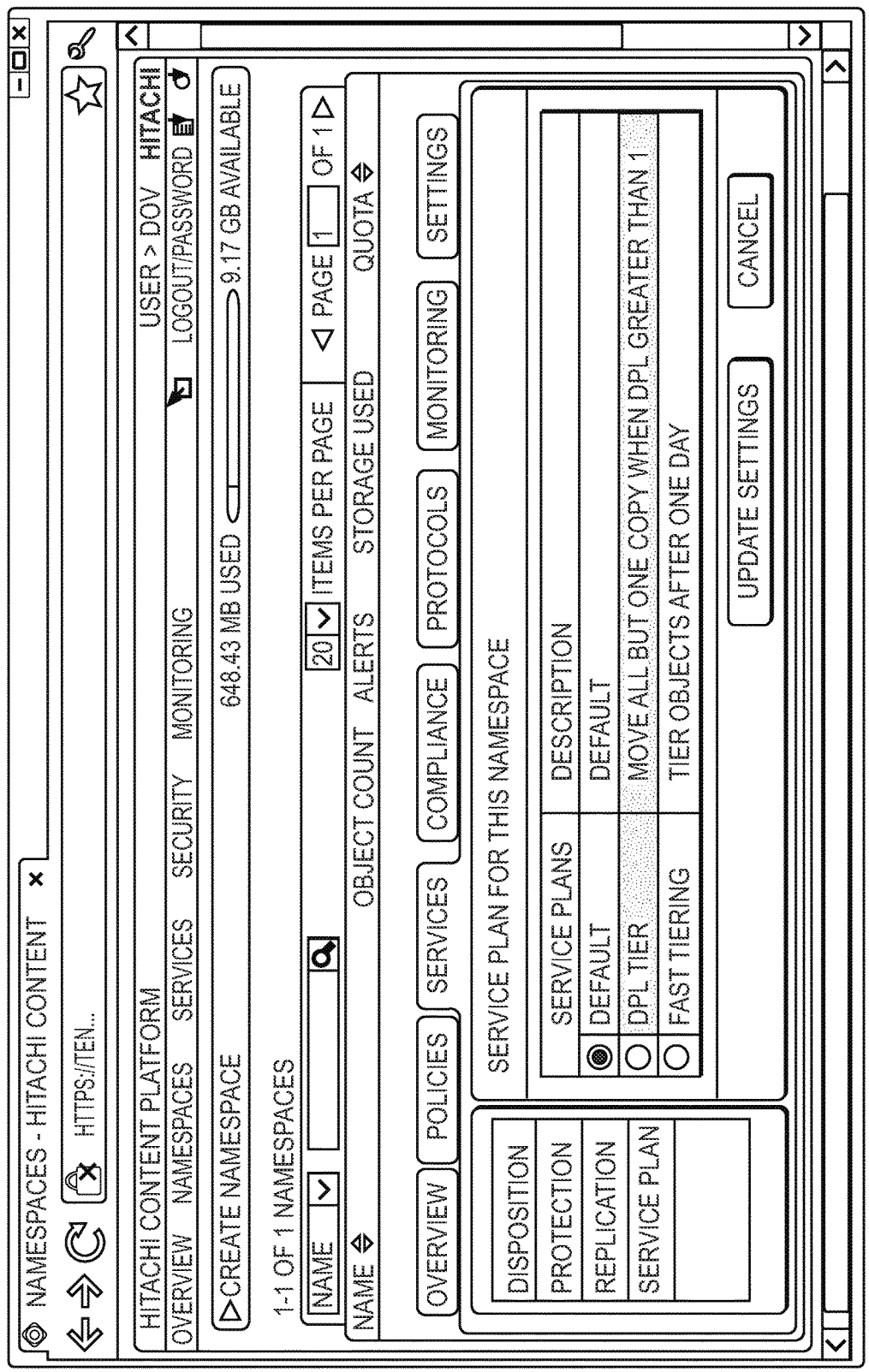

FIGS. 8A-8C shows an example of such a user interface 800, in the form of a display that allows a user/administrator to create and/or assign service plans. In the example shown, FIG. 8A shows a screen shot for creating a service plan and selecting the tiering policies. At the bottom of the screen are options to view and edit defined policies. In FIG. 8B, a screen shot shows what happens when selecting a service plan for a namespace to be created. In FIG. 8C, a screen shot shows how to change the service plan on an existing namespace.

Of course, the system configuration illustrated in FIG. 1 is purely exemplary of content platforms or replicated object storage systems in which the present invention may be implemented, and the invention is not limited to a particular hardware configuration. The computers and storage systems implementing the invention can also have known I/O devices (e.g., CD and DVD drives, floppy disk drives, hard drives, etc.) which can store and read the modules, programs and data structures used to implement the above-described invention. These modules, programs and data structures can be encoded on such computer-readable media. For example, the data structures of the invention can be stored on computer-readable media independently of one or more computer-readable media on which reside the programs used in the invention. The components of the system can be interconnected by any form or medium of digital data communication, e.g., a communication network. Examples of communication networks include local area networks, wide area networks, e.g., the Internet, wireless networks, storage area networks, and the like.

In the description, numerous details are set forth for purposes of explanation in order to provide a thorough understanding of the present invention. However, it will be apparent to one skilled in the art that not all of these specific details are required in order to practice the present invention. It is also noted that the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

From the foregoing, it will be apparent that the invention provides methods, apparatuses and programs stored on computer readable media for managing storage of fixed content in a fixed content system based on content selection for storage tiering. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

CITATION LIST

Patent Literature

[PTL 1]
U.S. Pat. No. 8,006,111
[PTL 2]
U.S. Pat. No. 7,155,466
[PTL 3]
U.S. Patent Publication No. 2007/0189153
[PTL 4]
U.S. Pat. No. 7,657,581
[PTL 5]
U.S. Patent Publication No. 2011/0106802

What is claimed is:

1. A server, which is coupled to a storage system having a plurality of storage media on which a plurality of first logical storage units as a first tier and a plurality of second logical storage units as a second tier are created, comprising:
   a memory; and
   a processor being configured to:
   store a plurality of content objects, each of which includes a content and an object metadata, across the plurality of first logical storage units;
   check the object metadata of each content object to determine whether a criteria is satisfied; and
   if a used capacity of the plurality of first logical storage units exceeds a threshold and a first object metadata included in a first content object of the plurality of content objects satisfies the criteria, move the first content object of the plurality of content objects from the plurality of first logical storage units to the plurality of second logical storage units,
   wherein the criteria of the first object metadata includes a type of data which is determined based on the content of the data of the first content object.

2. The server according to claim 1, wherein the criteria of the first object metadata includes a version of the first content object.

3. The server according to claim 1, wherein the criteria of the first object metadata includes a time from last access to the first content object.

4. The server according to claim 1, wherein the criteria of the first object metadata includes a time from ingest of the first content object.

5. A system comprising:
   one or more nodes, each of which has a processor and is coupled to a storage system having a plurality of storage media on which a plurality of first logical storage units as a first tier and a plurality of second logical storage units as a second tier are created;
   the processor being configured to:
   store a plurality of content objects, each of which includes a content and an object metadata, across the plurality of first logical storage units;
   check the object metadata of each content object to determine whether a criteria is satisfied; and
   if a used capacity of the plurality of first logical storage units exceeds a threshold and a first object metadata included in a first content object of the plurality of content objects satisfies the criteria, move the first content object in the plurality of content objects from the plurality of first logical storage units to the plurality of second logical storage units,
   wherein the criteria of the first object metadata includes a type of data which is determined based on the content of the data of the first content object.

6. The system according to claim 5, wherein the criteria of the first object metadata includes a version of the first content object.

7. The system according to claim 5, wherein the criteria of the first object metadata includes a time from last access to the first content object.

8. The system according to claim 5, wherein the criteria of the first object metadata includes a time from ingest of the first content object.

9. A method for a server, which is coupled to a storage system having a plurality of storage media on which a plurality of first logical storage units as a first tier and a plurality of second logical storage units as a second tier are created, the method comprising:
   storing a plurality of content objects, each of which includes a content and an object metadata, across the plurality of first logical storage units;
   checking the object metadata of each content object to determine whether a criteria is satisfied; and
   if a used capacity of the plurality of first logical storage units exceeds a threshold and a first object metadata included in a first content object of the plurality of content objects satisfies a criteria, moving the first content object in the plurality of content objects from the plurality of first logical storage units to the plurality of second logical storage units,
   wherein the criteria of the first object metadata includes a type of data which is determined based on the content of the data of the first content object.

10. The method according to claim 9, wherein the criteria of the first object metadata includes a version of the first content object.

11. The method according to claim 9, wherein the criteria of the first object metadata includes a time from last access to the first content object.

12. The method according to claim 9, wherein the criteria of the first object metadata includes a time from ingest of the first content object.

* * * * *